US011545282B2

(12) United States Patent
Li et al.

(10) Patent No.: US 11,545,282 B2
(45) Date of Patent: Jan. 3, 2023

(54) APPARATUS AND METHOD FOR SEPARATING AND SORTING USB WIRES

(71) Applicant: The Chinese University of Hong Kong, Hong Kong (CN)

(72) Inventors: Xiang Li, Hong Kong (CN); Zhi Chen, Xiantao (CN); Yuan Gao, Shanghai (CN); Yunhui Liu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 635 days.

(21) Appl. No.: 16/560,322

(22) Filed: Sep. 4, 2019

(65) Prior Publication Data

US 2020/0098493 A1    Mar. 26, 2020

Related U.S. Application Data

(60) Provisional application No. 62/756,661, filed on Nov. 7, 2018, provisional application No. 62/735,471, filed on Sep. 24, 2018.

(51) Int. Cl.
*H01B 13/012* (2006.01)
*H01R 43/28* (2006.01)
(Continued)

(52) U.S. Cl.
CPC ....... *H01B 13/01236* (2013.01); *G05B 15/02* (2013.01); *G06T 7/73* (2017.01);
(Continued)

(58) Field of Classification Search
CPC .......... H01B 13/01236; H01R 43/0263; H01R 43/43052; H01R 43/28
(Continued)

(56) References Cited

U.S. PATENT DOCUMENTS 3,693,228 A * 9/1972 Logan .............. H01B 13/01245
29/56.6
3,887,999 A * 6/1975 Ross .................... H01B 13/012
29/857

(Continued)

*Primary Examiner* — Alexander Gilman
(74) *Attorney, Agent, or Firm* — Schwegman Landberg & Woessner, P.A.

(57) ABSTRACT

Disclosed is an apparatus for separating and sorting USB wires. The apparatus comprises a separating apparatus for separating USB wires and a sorting apparatus provided downstream the separating apparatus. The separating apparatus comprises a first slider slidable in a horizontal plane in a reciprocating way; a second slider connected to the first slider via a sliding guide; and a teeth assembly comprising a group of first teeth and a group of second teeth. The sorting apparatus comprises a base plate; a wire holder fixed on the base plate and having a number of grooves for holding the wires therein; a sorting module arranged above the wire holder having a number of sorting slots corresponding to the number of the grooves; a gripping module mounted below the base plate and comprising a gripping head positioned at the interval between the wire holder and the sorting module; a vision module arranged above the interval for obtaining an image showing a location and a color of the wires in the grooves; and a control module for controlling the gripping head to grasp and move the wires to the corresponding slot.

12 Claims, 9 Drawing Sheets

(51) Int. Cl.
    *G06T 7/73*            (2017.01)
    *G06T 7/90*            (2017.01)
    *G05B 15/02*          (2006.01)
    *H01R 43/02*          (2006.01)
    *H01R 43/052*        (2006.01)

(52) U.S. Cl.
    CPC ........... *G06T 7/90* (2017.01); *H01R 43/0263* (2013.01); *H01R 43/052* (2013.01); *H01R 43/28* (2013.01); *G06T 2207/10024* (2013.01)

(58) Field of Classification Search
    USPC ........................................................ 382/162
    See application file for complete search history.

(56) References Cited

U.S. PATENT DOCUMENTS

| | | | | |
|---|---|---|---|---|
| 4,169,645 A * | 10/1979 | Faulconer | ............... | H01R 43/28 439/392 |
| 4,677,734 A * | 7/1987 | Bloch | .................... | B65H 51/20 29/564.6 |
| 4,821,636 A * | 4/1989 | Kraemer | .............. | B25J 15/0206 29/745 |
| 4,979,292 A * | 12/1990 | Fukuda | .................. | H01R 43/28 156/441 |
| 5,167,482 A * | 12/1992 | Cross | ............... | H01B 13/01236 294/99.1 |
| 5,210,942 A * | 5/1993 | Emmerich | ............ | H01R 43/28 29/748 |
| 5,709,025 A * | 1/1998 | Wuyts | .................... | G01R 31/60 29/721 |
| 5,709,027 A * | 1/1998 | Kato | ....................... | H01R 43/01 29/33 M |
| 5,771,574 A * | 6/1998 | Kato | ...................... | H01R 43/01 29/857 |
| 6,125,532 A * | 10/2000 | Takada | ............... | H01R 43/0249 29/748 |
| 6,321,445 B1 * | 11/2001 | Suzuki | ................... | H01R 43/28 29/33 M |
| 6,370,769 B1 * | 4/2002 | Lilienthal, II | ......... | H01R 43/01 29/748 |
| 6,615,486 B1 * | 9/2003 | Takada | ............... | H01R 43/0249 29/748 |
| 7,454,829 B2 * | 11/2008 | Anderson | .............. | H02G 11/02 29/721 |
| 7,774,927 B2 * | 8/2010 | Karrasch | ................ | H01R 43/28 29/748 |
| 8,141,238 B2 * | 3/2012 | Garcia | ................... | H05K 3/368 29/748 |
| 8,442,664 B1 * | 5/2013 | Guglielmo | ............. | H01R 43/28 29/33 M |
| 8,907,211 B2 * | 12/2014 | Fox | ........................ | H01B 9/028 174/33 |
| 9,317,023 B2 * | 4/2016 | Lu | ........................ | G01N 21/952 |
| 9,787,046 B2 * | 10/2017 | Lu | ........................ | H01R 43/28 |
| 10,671,045 B2 * | 6/2020 | Berther | ................ | G05B 19/19 |
| 10,679,777 B2 * | 6/2020 | Torres Moreno | ........................... | H01B 13/01227 |
| 11,322,278 B2 * | 5/2022 | Porter | ................ | H01R 43/0263 |
| 2003/0196320 A1 * | 10/2003 | Ikeda | ..................... | H01R 43/28 29/749 |
| 2018/0048105 A1 * | 2/2018 | MulHolland | ...... | H01R 43/0235 |
| 2018/0062340 A1 * | 3/2018 | Pechter | ................. | H01R 43/28 |
| 2020/0098493 A1 * | 3/2020 | Li | .................... | H01B 13/01236 |

* cited by examiner

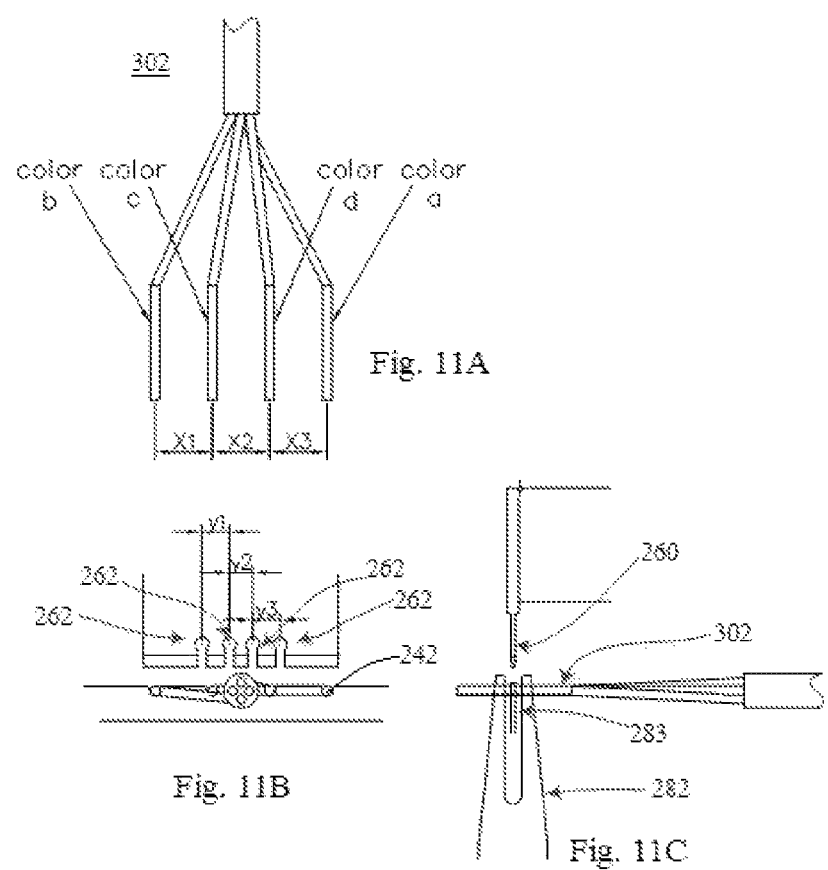

APPARATUS AND METHOD FOR SEPARATING AND SORTING USB WIRES

CLAIM FOR PRIORITY

This application claims the benefit of priority of U.S. Application Ser. No. 62/756,661, filed Nov. 7, 2018 and U.S. Application Ser. No. 62/735,471, filed Sep. 24, 2018, the benefit of priority of each of which is hereby claimed herein, and which applications are hereby incorporated herein by reference in their entireties.

TECHNICAL FIELD

The present disclosure relates to an apparatus and a method for separating and sorting USB wires automatically.

BACKGROUND

With a rapid development of 3C (Computer, Communication, and Consumer electronics) industry, a global market of 3C products (e.g. smart phones, laptops, tablets) has expanded rapidly and a strong demand has been reflected in the automatic manufacturing of USB wires.

In the current manufacturing procedures of USB wires, two pre-processing steps are required before wire soldering, that is, wire separation and wire sorting. In particular, the wires need to be separated from each other and then sorted and placed in corresponding grooves of a soldering machine, such that a desired USB color code is achieved (i.e. Red-White-Green-Black). At present, the wire separation and sorting are all done manually, and thus the operator needs to manually manipulate the wires to keep them away from each other and sequentially pick the wires to place them into the corresponding grooves in the soldering machine, such that the desired USB color code is achieved. Accordingly, the current operations of wire separation and sorting are heavily dependent on experiences and proficiencies of the operator, and thus it is difficult to achieve a desirable efficiency.

SUMMARY

In the disclosed solution, the wire separation and sorting are replaced with an automatic system/apparatus. The disclosed solution works after wire-stripping to automatically separate the wires by keeping each wire away from others at a specified distance in 2-D plane and sort the USB wires to be arranged in a desired USB color code.

In one embodiment of the present application, the disclosed solution is independent from an initial status of the wires and is capable of separating and sorting any wires with arbitrary shapes, locations, or alignment in 3-D space. This may eliminate current manual works in wire separation and sorting, and it may also be integrated with other automatic machines (for example, wire stripping or soldering machines), and then be formulated as a fully automatic solution to the assembly and manufacture of USB wires in 3C industry.

An aspect of the application refers to an apparatus for separating USB wires. The apparatus may comprise a first slider and a second slider. The first slider is slidable in a horizontal plane in a reciprocating way, and the second slider is connected to the first slider via a sliding guide arranged at a front side of the first slider, the sliding guide being substantively perpendicular to the horizontal plane and the second slider being movable along the guide. The apparatus further comprises a teeth assembly with a group of first teeth and a group of second teeth. The first teeth are connected to the second slider at a side opposite to the sliding guide and are movable with the second slider; and the second teeth are provided below the first teeth and separated from the first teeth. The teeth assembly has a movement status where the first teeth are movable with the first slider with respect to the second teeth to apply a force to separate the wires, and a stable status where the first teeth and the second teeth correspond to each other to form a plurality of grooves and the separated wires are received respectively in the grooves.

According to an exemplary embodiment of the application, the first slider may further comprise at least one lug protruded towards the second slider, and at least one spring may be arranged between the lug and the second slider for controlling the movement of the second slider.

According to an exemplary embodiment of the application, the first slider may further comprise a pair of lugs protruded towards the second slider; and a spring may be arranged between each lug and the second slider for controlling the movement of the second slider.

According to an exemplary embodiment of the application, the apparatus may further comprise a first sliding guide on which the first slider may be installed to slide in a reciprocating way.

According to an exemplary embodiment of the application, the first sliding guide may comprise two rails at both sides for supporting the first slider.

According to an exemplary embodiment of the application, a number of the first teeth and a number of the second teeth are adjustable based on a type of the USB wires.

According to an exemplary embodiment of the application, a chamber with a predetermined angle, for example 45 degree, may be provided on edges of the first teeth to produce a pushing force against the USB wires during a reciprocating movement of the first teeth.

According to an exemplary embodiment of the application, the first slider may be L-shaped and a first ribbed plate may be fixed on the first slider to reinforce the first slider.

According to an exemplary embodiment of the application, the second slider may be L-shaped and a second ribbed plate is fixed on the second slider to reinforce the first slider.

According to an exemplary embodiment of the application, the apparatus may further comprise a stepper motor driving the first slider to move in a reciprocating way such that the first teeth move with respect to the second teeth.

According to an exemplary embodiment of the application, the first teeth move with such a stroke that one end of the first teeth reach the other end of the second teeth.

According to an exemplary embodiment of the application, the apparatus may further comprise a stripping component for exposing the USB wires.

According to an exemplary embodiment of the application, the apparatus may further comprise a guider for supplying the exposed USB wires between the first teeth and the second teeth.

Another aspect of the application refers to a system for separating and sorting USB wires. The system may comprise a separating apparatus for separating USB wires and a sorting apparatus provided downstream the separating apparatus for sorting the USB wires in a desired color code. The separating apparatus may comprise a first slider slidable in a horizontal plane in a reciprocating way; a second slider connected to the first slider via a sliding guide arranged at a front side of the first slider, the sliding guide being substantively perpendicular to the horizontal plane and the second slider being movable along the sliding guide; and a teeth assembly comprising a group of first teeth and a group of second teeth, the first teeth being connected to the second slider at a side opposite to the sliding guide and being movable with the second slider; and the second teeth being provided below the first teeth and separated from the first teeth. The sorting apparatus may comprise a base plate; a wire holder fixed on the base plate and having a number of grooves for holding the wires separated by the separating apparatus therein; a sorting module arranged above the wire holder with a predefined lateral interval and having a number of sorting slots corresponding to the number of the grooves; a gripping module mounted below the base plate and comprising a gripping head positioned at the interval between the wire holder and the sorting module; a vision module arranged above the interval for obtaining an image showing a location and a color of the wires in the grooves; and a control module for controlling the gripping head to grasp and move the wires to the corresponding slot of the sorting module.

According to an exemplary embodiment of the application, the system may further comprise a cantilever, an end of which is fixed on the base plate at an end opposite to the sorting module, and other end of which extends across above the interval. The vision module may comprise an industrial camera arranged on the other end of the cantilever.

According to an exemplary embodiment of the application, the sorting module may comprise a wire receiving component at a bottom of which the sorting slots are formed.

According to an exemplary embodiment of the application, the sorting module may comprise a pinion and rack component for controlling a translational motion of the wire receiving component with respect to the wire holder to align each of the slots with each of the wires held in the grooves.

According to an exemplary embodiment of the application, the gripping module may comprise a linear motor installed under the base plate to drive the gripping head to move transverse to the wires held in the grooves.

According to an exemplary embodiment of the application, the gripping module may further comprise a connecting bracket installed on the motor; a linear guider is vertically installed on the connecting bracket to guide a vertical motion of the gripping head.

According to an exemplary embodiment of the application, the gripping module may further comprise a first lifting cylinder having a first piston rod and fixed to the linear guider; a second lifting cylinder having second piston rod and connected with the linear guider; wherein, the first piston rod is connected with the second lifting cylinder to move the second lifting cylinder along the linear guider up to a position close to the wires, and an air gripper installed on an end of the second piston rod of the second lifting cylinder to control the gripping head to grasp the wire and fix the grasped wire into a corresponding slot of the slots, wherein the gripping head is connected to an upper end of the air gripper.

According to an exemplary embodiment of the application, the gripping head may comprise a wire support for pushing the grasped wire into the corresponding slot of the slots.

According to an exemplary embodiment of the application, the sorting module may further comprise a stepper motor to drive the pinion and rack component to control the translational motion of the wire receiving component.

According to an exemplary embodiment of the application, the control module may comprise an image processing unit for obtaining location values and color information of each of the wires, and a control unit for controlling the gripping head based on the location values and color information.

According to an exemplary embodiment of the application, the system may further comprise a stripping apparatus arranged upstream the separating apparatus for exposing the USB wires, and a guiding member for supplying the exposed USB wires between the first teeth and the second teeth.

A further aspect of the application refers to an apparatus for sorting the USB wires. The apparatus may comprise a base plate; a wire holder fixed on the base plate and having a number of grooves for holding the wires therein; a sorting module arranged above the wire holder with a predefined lateral interval and having a number of sorting slots corresponding to the number of the grooves; a gripping module mounted below the base plate and comprising a gripping head positioned at the interval between the wire holder and the sorting module; a vision module arranged above the interval for obtaining an image showing a location and a color of the wires in the grooves; and a control module for controlling the gripping head to grasp and move the wires to the corresponding slot of the sorting module.

According to an exemplary embodiment of the application, the apparatus may further comprise a cantilever, an end of which is fixed on the base plate at an end opposite to the sorting module, and other end of which extends across above the interval. The vision module comprises a camera (e.g., an industrial camera) arranged on the other end of the cantilever.

According to an exemplary embodiment of the application, the sorting module may comprise a wire receiving component at a bottom of which the sorting slots is formed.

According to an exemplary embodiment of the application, the sorting module may comprise a pinion and rack component for controlling a translational motion of the wire receiving component with respect to the wire holder to align each of the slots with each of the wires held in the grooves.

According to an exemplary embodiment of the application, the gripping module may comprise a linear motor installed under the base plate to drive the gripping head to move transverse to the wires held in the grooves.

According to an exemplary embodiment of the application, the gripping module may further comprise a connecting bracket installed on the motor. A linear guider may be vertically installed on the connecting bracket to guide a vertical motion of the gripping head.

According to an exemplary embodiment of the application, the gripping module may further comprise a first lifting cylinder having a first piston rod and connected with the linear guider; and a second lifting cylinder having second piston rod and connected with the linear guider. The first piston rod may be connected with the second lifting cylinder to move the second lifting cylinder along the linear guider up to a position close to the wires. An air gripper may be installed on an end of the second piston rod of the second lifting cylinder to control the gripping head to grasp the wire and fix the grasped wire into a corresponding slot of the slots. The gripping head may be connected to an upper end of the air gripper.

According to an exemplary embodiment of the application, the gripping head may comprise a wire support for pushing the grasped wire into the corresponding slot of the slots.

According to an exemplary embodiment of the application, the sorting module may further comprise a stepper motor to drive the pinion and rack component to control the translational motion of the wire receiving component.

According to an exemplary embodiment of the application, the control module may comprise an image processing unit for obtaining location values and color information of each of the wires, and a control unit for controlling the gripping head based on the location values and color information.

A further another aspect of the application refers to a method for separating and sorting the USB wires. The method may comprises separating a plurality of wires; positioning the wires to have a first predefined lateral interval therebetween; defining a plurality of locations based on the predestined order, the locations having a second predefined lateral interval therebetween; image-processing the wires to obtain color information and a location value of a target wire; grasping the target wire based on the color information and the location value; moving the target wire horizontally to a position corresponding vertically to one of the locations based on the color information and the predetermined order; and pushing the target wire vertically to the one of the locations.

According to an exemplary embodiment of the application, the image-processing may comprise: setting a region of interest in the image; converting a RGB color space to HSV color space; setting different HVS parameters to filter different colors; getting a binary image of each of the different color as color information; finding a contour of the binary image and getting a center point of the contour; determining the center point as the location value; and sorting the target wire based on the color information and the location value.

BRIEF DESCRIPTIONS OF DRAWINGS

Exemplary non-limiting embodiments of the present disclosure are described below with reference to the attached drawings. The drawings are illustrative and generally not shown in an exact scale. The same or similar elements on different figures are referenced with the same reference numbers.

FIGS. 11A-11C illustrates the state of the USB wires before sorting according to an embodiment of the present disclosure.

DETAILED DESCRIPTIONS

Figure 1:
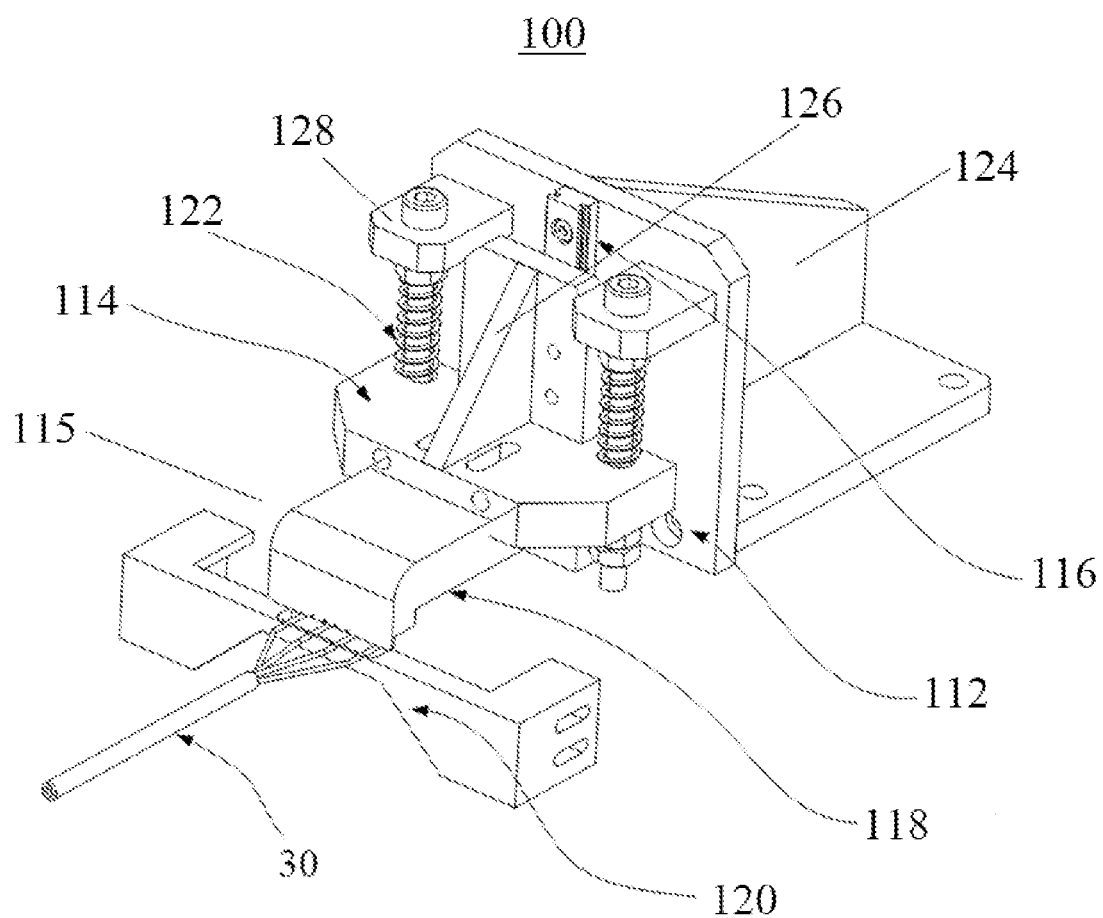
FIG. 1 illustrates a schematic structure of the apparatus for separating USB wires according to one embodiment of the present disclosure.

In the following description, for the purposes of explanation, several specific details are set forth in order to provide a thorough understanding of various exemplary embodiments or implementations of the application. As used herein "embodiments" and "implementations" are interchangeable words that are non-limiting examples of apparatus or methods employing one or more of the inventive concepts disclosed herein. It is apparent, however, that various exemplary embodiments may be practiced without these specific details or with one or more equivalent arrangements. In other instances, well-known structures and apparatus are not shown in the drawings in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, portions, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of components may be distorted for clarity and/or descriptive purposes.

When an element, such as a component, is referred to as being "on," "connected to," or "coupled to" another element or component, it may be directly on, connected to, or coupled to the other element or component or intervening elements or component may be present. When, however, an element or component is referred to as being "directly on," "directly connected to," or "directly coupled to" another element or component, there are no intervening elements or component present. To this end, the term "connected" may refer to physical, and/or electrical connection, with or without intervening elements. As used herein, the term "and/or" includes any and all combinations of one or more of the associated listed items.

Although the terms "first," "second," etc. may be used herein to describe various types of elements, these components should not be limited by these terms. These terms are used to distinguish one component from another component.

Thus, a first component discussed below could be termed a second component without departing from the teachings of the disclosure.

Spatially relative terms, such as "beneath," "below," "under," "lower," "above," "upper," "over," "higher," "side", and the like, may be used herein for descriptive purposes, and, thereby, to describe one component relationship to another component(s) as illustrated in the drawings. Spatially relative terms are intended to encompass different orientations of apparatus in use, operation, and/or manufacture in addition to the orientation depicted in the drawings. For example, if the apparatus in the drawings is turned over, components described as "below" or "beneath" other components or features would then be oriented "above" the other components or features. Thus, the exemplary term "below" can encompass both an orientation of above and below. Furthermore, the apparatus may be otherwise oriented and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, operations, elements, components, and/or groups thereof, but do not preclude the presence or addition of one or more other features, integers, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of components, but are to include deviations in shapes that result from, for instance, manufacturing. In this manner, components illustrated in the drawings may be schematic in nature and the shapes of these components may not reflect actual shapes of components of an apparatus and, as such, are not necessarily intended to be limiting.

Hereinafter, exemplary embodiments of the present disclosure will be described in detail with reference to the accompanying drawings.

Generally, before soldering the USB wires which comprise four (for example) wires together with a USB head, and the wires shall be properly aligned by following the USB color code, namely, Red-White-Green-Black. Failure to achieve the above sequence will affect the functionality of the soldered USB cables. It should be understood that the sequence may also be: Black-Green-White-Red, depending on the structure of the soldering machine and also the view point.

The present apparatus is proposed for the automatic separating and sorting of USB wires, in particular, separating the wires and then sequentially grasping and manipulating the four wires such that the alignment of the wires follows the USB color code.

The system according to the present disclosure may comprise an apparatus 100 for separating USB wires (hereinafter, "separating apparatus") and an apparatus 200 for sorting USB wires (hereinafter, "sorting apparatus").

The schematic structure of the separating apparatus 100 is shown in FIG. 1. The separating apparatus 100 may comprise a first slider 112 and a second slider 114. The first slider 112 is configured to slide left and right in a horizontal plane in a reciprocating way. A first sliding guide 128 (i.e., a horizontal guide component) may be provided on a fixed base 150 to support the first slider 112 and allow the first slider 112 to slide thereon in the reciprocating way. The first sliding guide 128 may include a pair of rails to balance the first slider 112 during the reciprocating movement. The first sliding guide 128 is also referred as "base guide" in the disclosures.

The second slider 114 is connected to the first slider 112 via a second sliding guide 116 arranged at a front side of the first slider 112. The second sliding guide 116 may be perpendicular to the horizontal plane. As shown, the separating apparatus 110 further comprises a teeth assembly 115 having a group of first teeth 118 connected to the second slider 114 at a side opposite to the second sliding guide 116 and being movable with the second slider 116, and a group of second teeth 120 provided below the first teeth 118 with a predefined distance. The teeth assembly 115 has a movement status where the first teeth 118 are movable with the first slider 112 with respect to the second teeth 120 to apply a force to separate the wires, and a stable status where the first teeth 118 and the second teeth 120 correspond to each other to form a plurality of grooves (spaces) and the separated wires are received respectively in the grooves.

The second sliding guide 116, which is perpendicular to the horizontal plane, allows the second slider 114 to slide up and down depending on the contacting force between the first teeth 118 and the second teeth 120. The number of the first teeth 118 and the number of the second teeth 120 are designed to adapt the type of a wire harness object. The width of each of the grooves is determined by width between each two of the first teeth 118 and 120.

As shown in the exemplary embodiment of FIG. 1, the movement of the second slider 114 along the second sliding guide 116 may be adjusted by arranging a pair of springs 122 parallel to the second sliding guide 116 so as to control the distance between the first teeth 118 and the second teeth 120 depending on the diameter of the wires. That is, where the diameter of the wires is larger, the wires urge the first teeth 118 to move up and then the springs 122 are compressed. In the other hand, where the diameter of the wires is small, the first teeth 118 will move down such that the distance between the teeth 118 and 120 will be suitable to the small wires.

The first slider 112 further comprises a pair of lugs 142 protruded towards the second slider, and each of the spring 122 is arranged between each lug 142 and the second slider 114 so as to control the movement of the second slider. The pair of lugs 142 is provided at a side near to the second slider 114 on the first slider 112 and is symmetrical with respect to the second sliding guide 116. It should be noted that the movement of the vertical sliding guide 116 may also be controlled by an automatic control mechanism. For example, a force transducer (not shown) may be provided between the first teeth 118 and the second teeth 120 to detect the contacting force therebetween. The detected contacting force may be used to trigger the automatic control mechanism to operate.

During the operation of the separating apparatus 110, stripped wires 30 are put between the first teeth 118 and the second teeth 120 (approximately at the centre of the second teeth 120), and the separating apparatus 100 works to automatically separate wires by controlling the relative and repetitive movement between the first and the second teeth 118 and 120. As the second slider moves, the first teeth connected to the second slider moves, too. The movement of first teeth 118 with respect to the second teeth 120 will apply a force to separate the wires, and the separated wires 302 are received respectively in the grooves formed by the first and second teeth 118 and 120.

According to an exemplary separating mechanism of the apparatus, the apparatus 100 may be driven by a linear motorized stage. The linear stage is controlled to move left and right in the horizontal plane in a reciprocating way. The first slider 112 and the second slider 114 are installed on the linear stage. The second sliding guide 116 is provided on the first slider 112 and perpendicular to the horizontal plane. Then, the second sliding guide 116 is connected to the second slider 114. A pair of springs 122 is installed to constrain the movement of the second slider 114 in the vertical direction. The first teeth 118 are installed on the second slider 114, where the first teeth 118 are controlled to move in 2D plane, and the second teeth is installed in the base of the mechanism (fixed base). When the target wires are to be separated, the root of the whole cable (i.e. the non-stripped part) is fixed and the wires (after stripping) are clamped by the first and the second teeth.

The preparation phase may include stripping the cable such that the wires are exposed; placing the wires around the centre of the first and the second teeth, and fixing the root of the cable. Then, the apparatus 100 operates to separate the wires. When the apparatus 100 is working, the first teeth 118 moves repetitively in the horizontal direction and also automatically adjusts its height according to the status of the wires (i.e. whether the wire has been fixed into the corresponding groove or not). When the wires are fully separated, both the first and the second teeth 118 and 120 stop and stick to each other.

Figure 6:
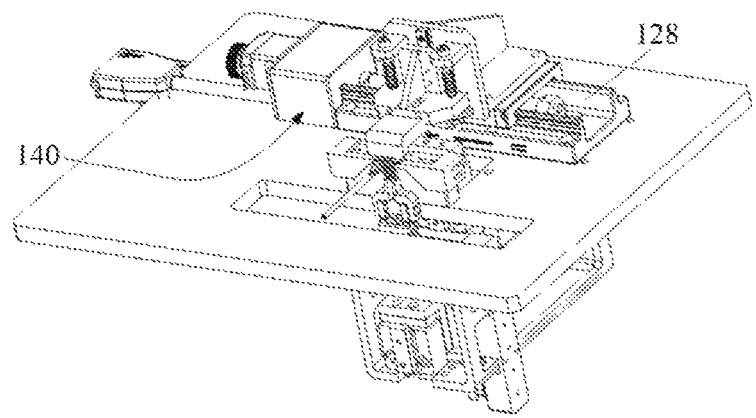
FIG. 6 illustrates an exemplary installation of the apparatus for separating USB wires according to one embodiment of the present disclosure.

The separating apparatus 100 may further comprise a stepper motor 140 (shown in FIG. 6) to drive the linear stage, and both the position and the speed of the motor are controlled with software. The stroke of the linear stage is designed such that one end of the first teeth 118 may reach the other end of the second teeth 120, and vice versa. The moving speed is set as high as possible, given that the wires have been fixed into the second teeth 120.

The contacting force between the first teeth 118 and the second teeth 120 enables the first teeth 118 to move in the vertical direction and may be adjusted by the pair of springs. The force should be set neither too large (which may damage the wires) nor too small (which cannot push the wires into the lower teeth).

A chamfer with a predetermined angle (for example, 45 degrees) may be fabricated on the edge of the first teeth 118, which may produce pushing forces against the wires during the reciprocating movement. The force in the horizontal direction contributes to drive the wires to transit above the grooves between each second teeth 120, and the force in the vertical direction is to push them into the corresponding grooves.

The size of the groove is designed to match the size of the wire, such that the fixed wire may exactly fill up the groove without affecting other wires. The total number and the size of the grooves may be customized to suit other wires.

In a further exemplary embodiment, the first and the second teeth 118 and 120 may be provided with a replaceable teeth portion, respectively, to adapt any different types of objects. In addition, the replaceable teeth portion makes the replacement of the worn teeth portion easier.

The mechanism may automatically separate the wires regardless of the initial status (i.e. the shape, the location, and the alignment of wires). Any bundle of wires with arbitrary initial configurations in 3-D space may be separated such that each wire is fixed at the corresponding groove in the same 2-D plane. In addition, the USB wires is only used to show the principle of the present separating apparatus and does not aim to limit the application in any way.

Figure 2:
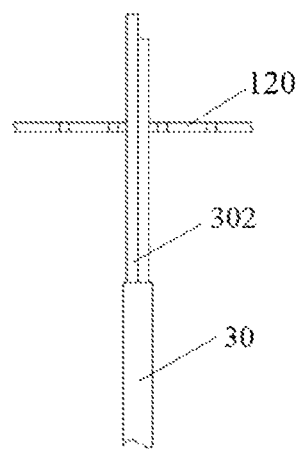
FIG. 2 illustrates the state of the USB wires before being separated according to one embodiment of the present disclosure.
Figure 3:
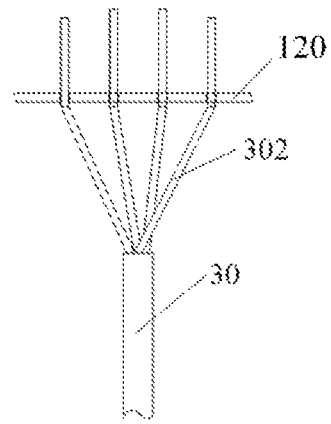
FIG. 3 illustrates the state of the USB wires after the separating process according to one embodiment of the present disclosure.
Figure 4:
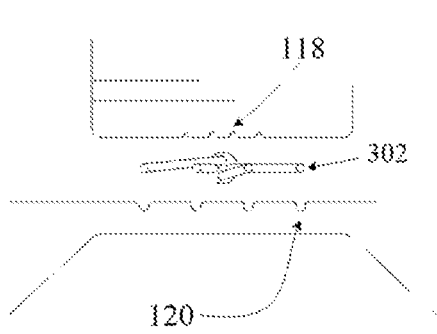
FIG. 4 illustrates the profile of the upper teeth component and the lower teeth component of the apparatus for separating USB wires according to one embodiment of the present disclosure.
Figure 5:
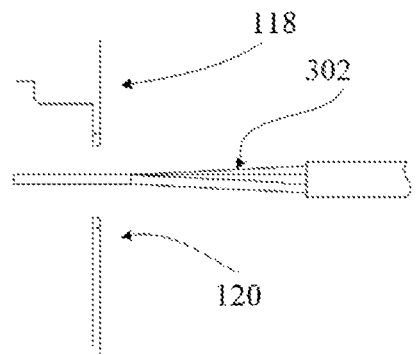
FIG. 5 is a side view showing the position relationship of the upper teeth component, the lower teeth component, and the wire harness according to one embodiment of the present disclosure.

The results before and after separating are seen in FIGS. 2 and 3, respectively. In particular, the first teeth 118 is moving in a 2-D plane which is perpendicular to the wires, where its movement in the horizontal direction is repetitive between the left side and the right side, and its movement in the vertical direction is to push a specific wire into the corresponding groove between two second teeth. The second teeth 120 is static and to provide supports for the whole bundle of wires. The pushing force in the vertical direction may be adjusted by tuning the springs. The locations of the first and the second teeth with respect to the wires are shown in FIGS. 3 and 4. As shown in FIG. 4, the developed mechanism may be integrated with other automatic machines in 3C manufacturing.

According to an exemplary embodiment of the present application, the first slider 112 and the second slider 114 may be designed to be L-shaped. Referring back to FIG. 1, the horizontal portion of the first slider 112 may be used to slide along the first sliding guide 128 and the vertical portion of the first slider 112 may be used to support the second slider 114. That is to say, the second sliding guide 116 is provided on the vertical portion of the first slider 112. The vertical portion of the second slider 114 is connected to the first slider 112 via the second sliding guide 116 provided on the vertical portion of the first slider 112.

In order to improve the stability of the first slider 112 and the second slider 114, a ribbed plate 124 is fixed between the horizontal portion and the vertical portion of the first slider 112, and a ribbed plate 126 is fixed between the horizontal portion and the vertical portion of the second slider 114.

The separated wires 302 are then supplied to the sorting apparatus 200 to be arranged in a desired USB color code.

Figure 7:
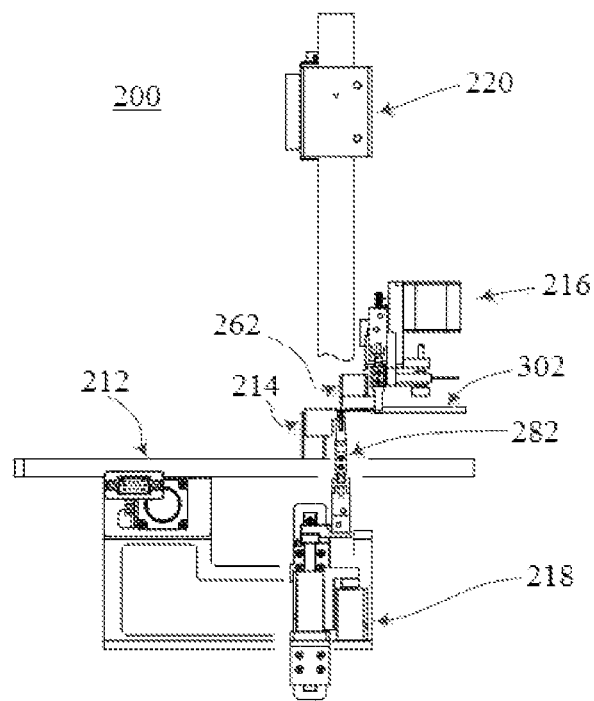
FIG. 7 illustrates a schematic front view of the apparatus for sorting USB wires according to an embodiment of the present disclosure.
Figure 8:
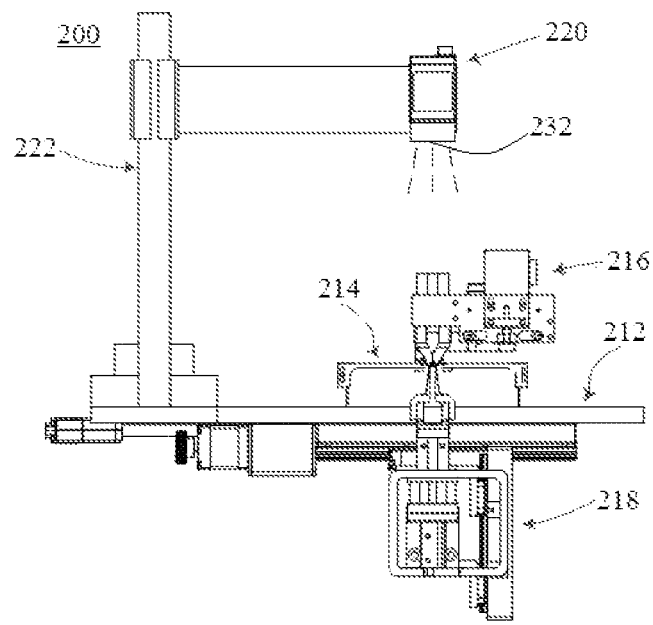
FIG. 8 illustrates a schematic side view of the apparatus for sorting USB wires according to an embodiment of the present disclosure.

The overall structure of the apparatus 200 is shown in FIGS. 7 and 8, which may comprise a wire holder 214 fixed on a base plate 212, a sorting module 216 arranged above the base plate 212, and a gripping module 218 mounted below the base plate 212.

The wire holder 214 comprises a number of grooves 242 for holding each of the separated wire 302 of the USB wire harness therein. The sorting module 216 may comprise a number of sorting slots 262 corresponding to the number of the grooves 242 for receiving each wire 302 into each of the corresponding sorting slots 262 based on the color of the wires 302. The sorting module 216 may comprise a receiving component 260 on which the sorting slots 262 may be formed. The sorting module 216 is positioned such that there is a predefined lateral interval between the grooves 242 and the sorting slots 262. In the sorting module 216, a motor, for example, a stepper motor 264 may drive the sorting slots 262 to move transverse to the wires held in the grooves via a pinion and rack transmission structure 265.

In the gripping module 218, a linear motor 284 is installed under the base plate 212. The gripping module 218 comprises a gripping head 282 positioned at the interval between the grooves 242 and the sorting slots 262. The linear motor 284 may drive the gripping head 282 to move in a horizontal direction (a direction as shown by arrow F in FIG. 10), i.e., a direction transverse to the wires held in the grooves. A connecting bracket 286 is installed on the motor 284, and a linear guider 288 is vertically installed on the connecting bracket 286. The gripping module 218 further comprise a first lifting cylinder 285 having a first piston rod (not shown) and connected with the linear guider 288 and a second lifting cylinder 287 having second piston rod (not shown) and connected with the linear guider 288. The first piston rod may be connected with the second lifting cylinder to move the second lifting cylinder along the linear guider up to a position close to the wires. In particular, the first lifting cylinder 285 is fixed on the linear guider 288 and the second lifting cylinder 287 is movably connected to the linear guider 288 such that the second lifting cylinder 287 is movable vertically along the linear guider 288 by the first piston rod of the first lifting cylinder 285.

An air gripper 290 may be installed on an end of the second piston rod of the second lifting cylinder 287, to control the gripping module 218 with another cylinder to grasp a wire 302 and fix it into the sorting slots 262 of the sorting module 216. It should be noted that two lifting cylinders are used to ensure a movement accuracy of the air gripper 290 and thus the gripping head 282. However, it is obvious that a technical solution having a lifting cylinder is also feasible, provided that the lifting cylinder has higher movement accuracy.

The sorting apparatus 200 may further comprise a vision module 220 with a camera, such as an industrial camera 232. The vision module 220 may be fixed to the base plate 212 by a cantilever 222. An end of the cantilever 222 is fixed on the base plate at an end opposite to the sorting module, and other end of the cantilever 222 extends across above the interval. The vision module 220 and thus the industrial camera 232 are provided at the other end of the cantilever 222. The field of view of the camera 232 may be adjusted such that the camera 232 may capture the location of the wires, which is then used as the vision feedback in the software of wire sorting. Generally, the vision module 220 is arranged above the interval by the cantilever 222 for easily obtaining an image showing the location and the color of the wire 302.

Figure 9:
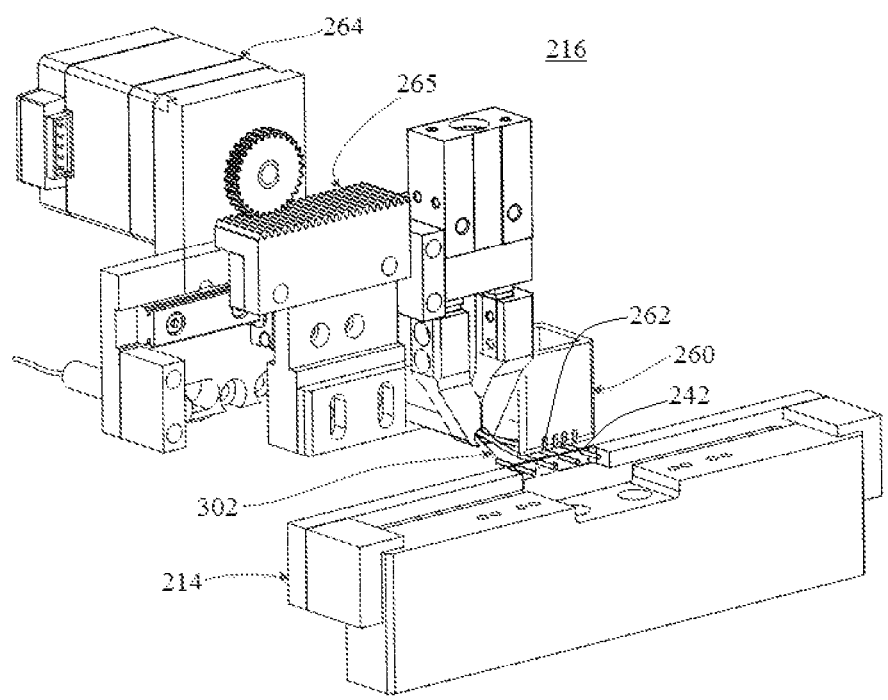
FIG. 9 illustrates a schematic perspective view of the sorting module of the apparatus for sorting USB wires according to an embodiment of the present disclosure.
Figure 10:
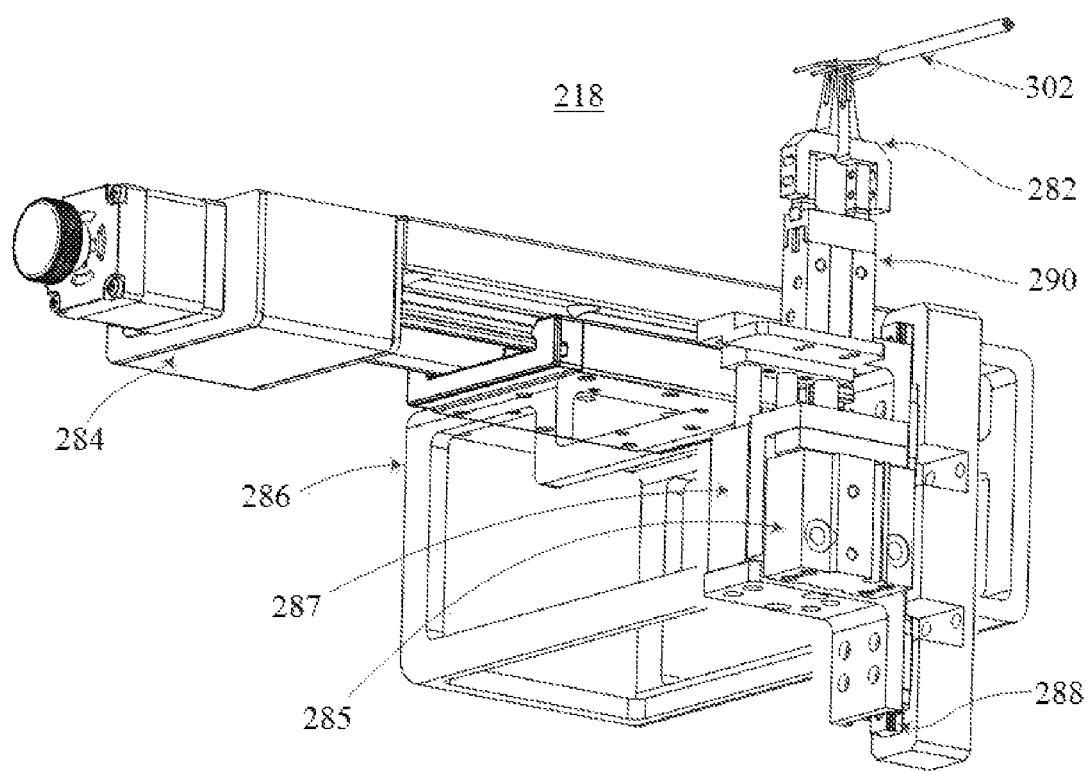
FIG. 10 illustrates a schematic perspective view of the gripping module of the apparatus for sorting USB wires according to an embodiment of the present disclosure.

The structure of the sorting module 216 and the gripping module 218 is shown in FIG. 9 and FIG. 10 respectively. The sorting module 216 and the gripping module 218 move in parallel, such that the gripping head 282 is in line with the position of the most left wire (from top view), and the corresponding sorting slots 262 of the receiving component 260 is also in line with the position of the most left wire (from top view), where the sorting slots 262 of the receiving component 260 are set as, for example: No. 1—Red wire, No. 2—White wire, No. 3—Green wire, No. 4—black wire (from left to right). Then, the gripping head 282 moves upward via the first lifting cylinder 285 to grasp the wire 302 and push it into the corresponding sorting slots 262 of the receiving component 260 with the second lifting cylinder 287. The aforementioned process is repeated till the completion of all the four wires. The gripping head comprises a wire support 283 for pushing the grasped wire 302 into the corresponding sorting slot 262 of the sorting module.

Figures 12A, 12B, 12C:
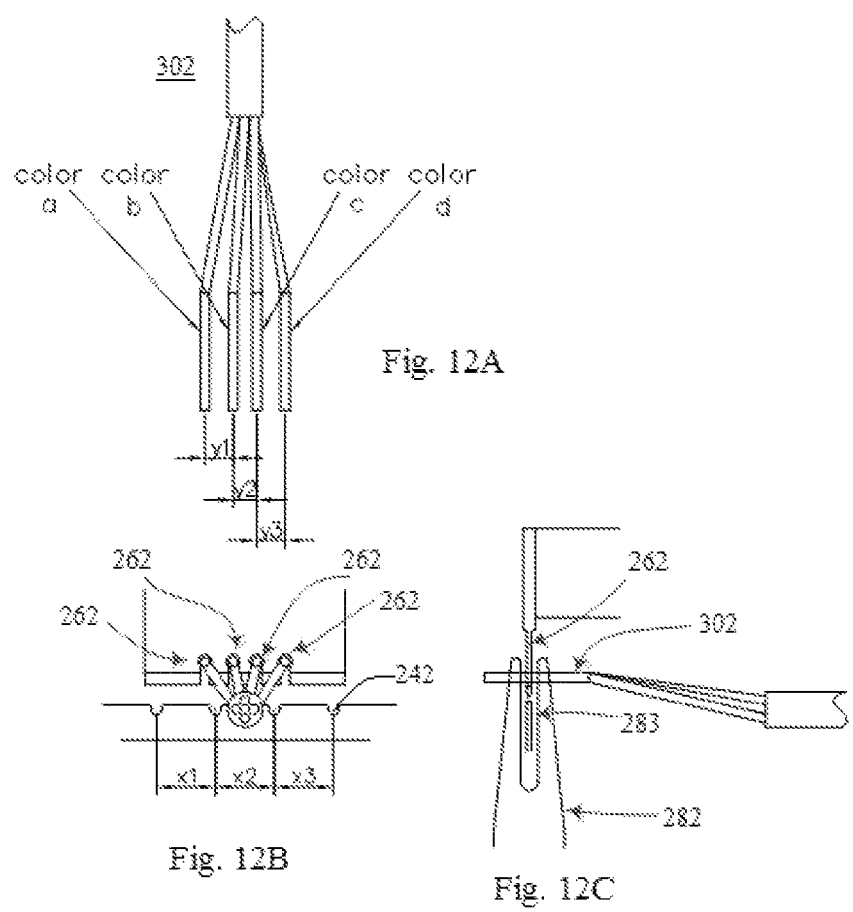
FIGS. 12A-12C illustrates the state of the USB wires after sorting according to an embodiment of the present disclosure.

The color and the grasping point of the wires 302 are obtained with the proposed algorithm of image processing (see FIGS. 11A-11C), and then the information is fed back to the proposed control algorithm to control the movement of both the sorting module 216 and the gripping module 218. The results of wire sorting may be found in FIGS. 12A-12C.

The apparatus 200 may further comprise a control module for controlling the gripping head 282 to grasp and move the wires 302 to the corresponding slot of the sorting module. The control module comprises an image processing unit for obtaining location values and color information of each of the wires from an image obtained by the industrial camera 232, and a control unit for controlling the gripping head based on the location values and color information.

Figure 13:
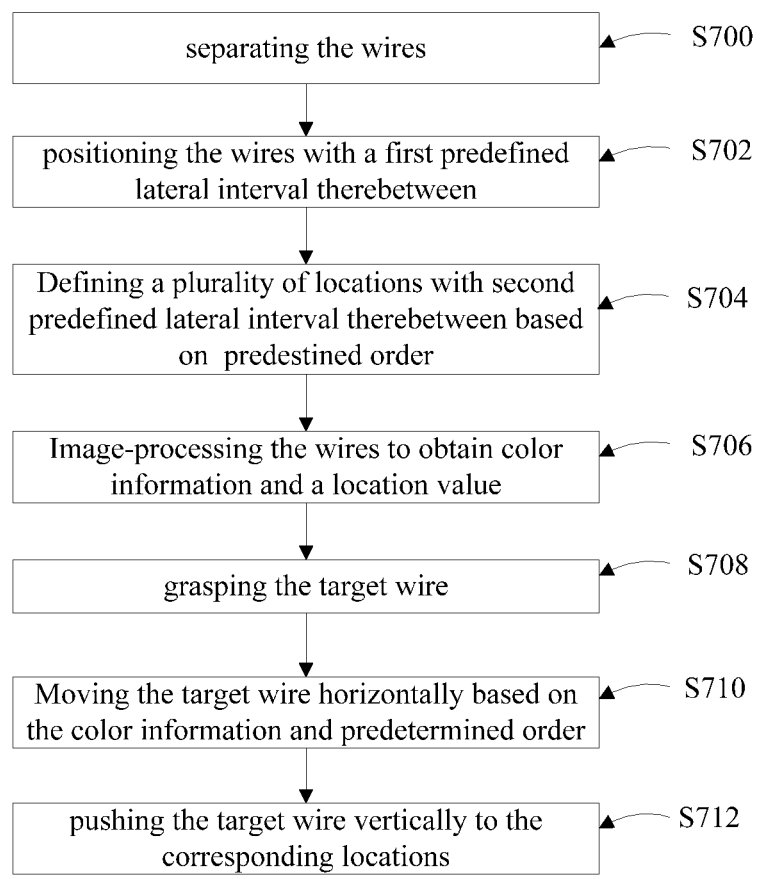
FIG. 13 illustrates a schematic flow chart for separating and sorting the USB wires according to an embodiment of the present disclosure.

The process for sorting the USB wire harness, according to one embodiment of present application, will be described in reference to FIG. 13. The process starts with Step S700, at which the wires in the USB wire harness are separated from each other at a specified distance in 2-D plane. Then the process proceeds to Step S702, at which each of the separated wire 302 is guided and positioned in each of the grooves 242, such that each of the wires 302 are arranged with a first predefined lateral interval. A predestined order for the plurality of wires is defined by the sorting slots of the sorting module in Step S704 to ensure there is a second predefined lateral interval between each of the wires. Then the initial alignment of the USB wires 302 is measured with the camera 232 to obtain the color and the location of each wire 302 and then obtain the location values and color information of the interested wire (i.e., target wire) are obtained by the control module at Step 706.

Under the proposed control algorithm, the receiving component 260 and thus the sorting slots 262 and the gripping head 282 are controlled to move in parallel to the position of a specific target wire 302.

Taking the apparatus as shown in FIGS. 7-8 as example, the movement of the gripping head 282 in the grasping operation for placing a specific target wire is described as below. First, the first lifting cylinder 285 is lifted up, and the gripping head 282 is close to grasp the wire. Then the gripping head 282 grasps the target wire 302 at Step S708 and moves the target wire horizontally to a position corresponding vertically to one of the sorting slots based on the color information and the predetermined order at Step S710. Then the target wire may be pushed vertically into the corresponding sorting slots 262 at Step S712. In particular, the second lifting cylinder 287 is lifted up by the first piston rod of the first lifting cylinder 285 to push the gripping head 282 upwards, and then the gripping head 282 manipulates the target wire 302 to move into the corresponding sorting slots 262. After the target wire 302 is placed into the corresponding sorting slots 262, the cylinder of the air gripper 290 is released, while both the lifting cylinders 285 and 287 move downwards to the home position, which prepares for the next operation. The lifting cylinders 285 and 287 are installed on the linear guide 288 such that the movement accuracy in the vertical direction is guaranteed.

The aforementioned steps are repeated till all of the four wires are properly placed into the sorting slots 262, such that the desired USB color code is achieved. A technique of multi-threads may be introduced into the programming of the control algorithms and image processing, to improve the real-time performance of the sorting apparatus.

Figure 14:
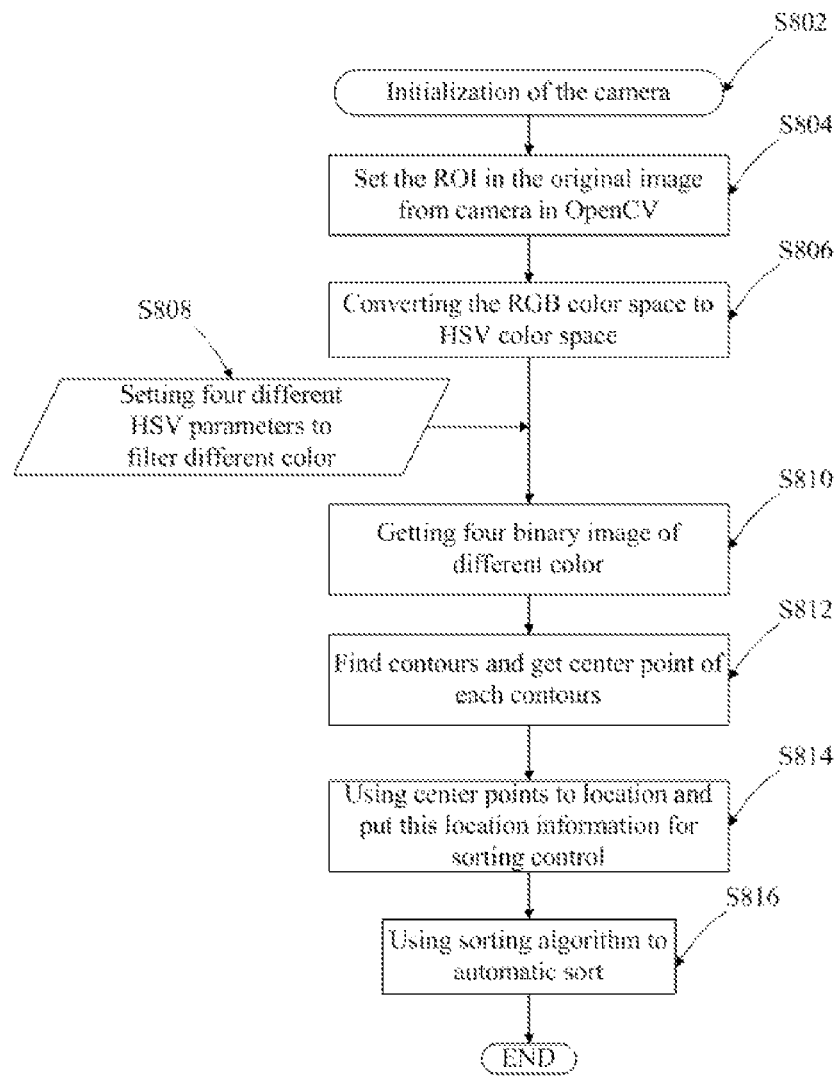
FIG. 14 illustrates a flow chart of image processing and control algorithm according to an embodiment of the present disclosure.

The flow chart of image processing and control algorithm according to one embodiment of present application is shown in FIG. 14. Before the apparatus 200 is preparing for sorting the USB wires, the camera is initialized (Step S802). The image processing and control task will be described as below: obtaining an image for the target wire and setting a region of interest in the image from the camera in OpenCV at Step S804; converting a RGB color space to HSV color space at Step S806; setting different HVS parameters to filter different colors at Step S808; getting a binary image of each of the four different color as color information at Step S810; finding contour of the binary image and getting center point of the contour at Step S812; using the center point as the location value at Step S814; and sorting the target wire based on the color information and the location value at Step S816.

After one or more wires 302 are placed into the sorting slots 262, the entanglement will arise in the region around the roots of wires, which limits the space for the operation of grasping. The problem is alleviated from the following three aspects. First, the center of the gripping head 282, the grasping point on the wire 302, and the center of the sorting slots 262 are aligned with the same plane. Second, the end tip of the gripping head 282 may be fabricated to be slender. Third, the grasping point may be chosen to be close to the end tip of the wire 302. The aforementioned solution helps to enlarge the space for the operation of grasping.

The spacing and the number of the sorting slots 262 should be designed and fabricated to suit the physical dimension of the USB wires. The width of the entrance of the sorting slots 262 may be designed to be slightly smaller than the diameter of the wire 302, such that the wire 302 may be pushed into the sorting slots 2162 and also it is not easy for the wire 302 to escape from the slots 262. The diameter of the hole inside the slots 262 is slightly larger than the diameter of the wire 302, such that the wires 302 which are already inside the hole may move to suit the reciprocating motion of the receiving component without escaping from the hole.

The raw data from the camera may be processed by converting the RGB format into the HSV format, such that the processed image is relatively less sensitive to the changes in the illumination, which helps to improve the robustness of the algorithm. Then, the wires 302 with different colors within the known environment may be recognized by setting the parameters of H, S, and V.

The binary images of the wires 302 are obtained after the color recognition. Then, the grasping point may be calculated as follows. First, the region of interest in the binary image is set; second, the contour of the wire 302 is searched and determined; third, a minimum bounding rectangle is formulated to enclose the contour; fourth, the coordinates of the center of the rectangle are calculated by referring to the known coordinates of the four corners of the rectangle; fifth, the grasping point is derived from the coordinates of the center.

The sorting algorithm is used to generate the desired path for the gripping head 282, such that the wires 302 with arbitrary initial status may be manipulated into the desired configuration. That is, the red, white, green, black wires are placed into the slots of No. 1 to No. 4 respectively.

The positions of the sorting slots 262 with respect to the origin of the mechanical structure are calibrated. The stepper motor may be controlled to drive the specific sorting slot 262 to be in line with the grasping position of the corresponding wire 302, wherein the grasping position is derived from the coordinates of the center. Then the gripping head 282 moves to push the wire 15 into the corresponding sorting slot 262. Before the sorting operation on the next wire, the positions of the sorting slots 262 should be updated by referring to the calibrated initial positions and the travelling distanced recorded by encoders.

It has been validated that the performance of the proposed mechanism is surprising. In particular, the success rate of the separating apparatus verified with experiments on 100 pieces of USB wires is 100%, and every bundle of wires may be quickly and completely separated after two to three round-trips of the separating teeth. The success rate of the sorting apparatus verified with 96 bundles of USB wires is 100%. The average sorting time is around 14 seconds.

The performance of the proposed sorting apparatus is present as Table 1. There are a total of 24 combinations for the initial alignment of four USB wires, as summarized in the Table 1, where R, W, G, B denote the red, white, green, and black wires respectively. Under a specific combination, the sorting operation on four bundles of USB wires has been tested.

TABLE 1

| First wire | Second wire | Third wire | Fourth wire |
|---|---|---|---|
| R | W | G | B |
|   |   | B | G |
|   | G | W | B |
|   |   | B | W |
|   | B | W | G |
|   |   | G | W |
| W | R | G | B |
|   |   | B | G |
|   | G | R | B |
|   |   | B | R |
|   | B | R | G |
|   |   | G | R |
| G | R | W | B |
|   |   | B | W |
|   | W | R | B |
|   |   | B | R |
|   | B | R | W |
|   |   | W | R |
| B | R | W | G |
|   |   | G | W |
|   | W | R | G |
|   |   | G | R |
|   | G | R | W |
|   |   | W | R |

The system is able to assess the initial status of the USB wires and automatically separate, grasp and then sort the wires according to the desired USB color. Hence, it may replace the existing manual works required in the current separating and sorting operation. In addition, the system may also be used to separate and sort other kind of wires except for the USB wire based on a predetermined order.

The system of the present disclosure may be widely implemented in 3C manufacturing factories for automatic wire separating and sorting, then deal with problems associated with manual operations, such as shortage of skilled workers, rapidly increasing wages, inconsistency of quality, etc.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated. While the present disclosure has been particularly shown and described with reference to exemplary embodiments thereof, it will be understood by those of ordinary skill in the art that various changes in form and details may be made therein without departing from the spirit and scope of the present disclosure.

What is claimed is:

1. A system, comprising
a separating apparatus for separating USB wires comprising
a first slider slidable in a horizontal plane in a reciprocating way;
a second slider connected to the first slider via a sliding guide arranged at a front side of the first slider, the sliding guide being substantively perpendicular to the horizontal plane and the second slider being movable along the sliding guide; and
a teeth assembly comprising a group of first teeth and a group of second teeth, the first teeth being connected to the second slider at a side opposite to the sliding guide and being movable with the second slider; and the second teeth being provided below the first teeth and separated from the first teeth, and
a sorting apparatus provided downstream the separating apparatus, wherein the sorting apparatus comprises;
a base plate;
a wire holder fixed on the base plate and having a number of grooves for holding the wires separated by the separating apparatus therein;
a sorting module arranged above the wire holder with a predefined lateral interval and having a number of sorting slots corresponding to the number of the grooves;
a gripping module mounted below the base plate and comprising a gripping head positioned at the interval between the wire holder and the sorting module;
a vision module arranged above the interval for obtaining an image showing a location and a color of the wires in the grooves; and
a control module for controlling the gripping head to grasp and move the wires to the corresponding slot of the sorting module.

2. The system according to claim 1, further comprising a cantilever, an end of which is fixed on the base plate at an end opposite to the sorting module, and other end of which extends across above the interval;
wherein the vision module comprises an industrial camera arranged on the other end of the cantilever.

3. The system according to claim 1, wherein the sorting module comprises a wire receiving component at a bottom of which the sorting slots are formed.

4. The system according to claim 3, wherein the sorting module comprises a pinion and rack component for controlling a translational motion of the wire receiving component with respect to the wire holder to align each of the slots with each of the wires held in the grooves.

5. The system according to claim 4, wherein the gripping module comprises a linear motor installed under the base plate to drive the gripping head to move transverse to the wires held in the grooves.

6. The system according to claim 5, wherein the gripping module further comprises a connecting bracket installed on the motor, a linear guider is vertically installed on the connecting bracket to guide a vertical motion of the gripping head.

7. The system according to claim 6, wherein the gripping module further comprises:
a first lifting cylinder having a first piston rod and fixed to the linear guider; and
a second lifting cylinder having second piston rod and connected with the linear guider;
wherein, the first piston rod is connected with the second lifting cylinder to move the second lifting cylinder along the linear guider up to a position close to the wires, and
an air gripper installed on an end of the second piston rod of the second lifting cylinder to control the gripping head to grasp the wire and fix the grasped wire into a corresponding slot of the slots, wherein the gripping head is connected to an upper end of the air gripper.

8. The system according to claim 1, wherein the gripping head comprises a wire support for pushing the grasped wire into the corresponding slot of the slots.

9. The system according to claim 4, wherein the sorting module further comprises a stepper motor to drive the pinion and rack component to control the translational motion of the wire receiving component.

10. The system according to claim 1, wherein the control module comprises:
an image processing unit for obtaining location values and color information of each of the wires, and
a control unit for controlling the gripping head based on the location values and color information.

11. The system according to claim 1, further comprising a stripping apparatus arranged upstream the separating apparatus for exposing the USB wires, and
a guiding member for supplying the exposed USB wires between the first teeth and the second teeth.

12. An apparatus, comprising:
a base plate;
a wire holder fixed on the base plate and having a number of grooves for holding the wires therein;
a sorting module arranged above the wire holder with a predefined lateral interval and having a number of sorting slots corresponding to the number of the grooves;
a gripping module mounted below the base plate and comprising a gripping head positioned at the interval between the wire holder and the sorting module;
a vision module arranged above the interval for obtaining an image showing a location and a color of the wires in the grooves; and
a control module for controlling the gripping head to grasp and move the wires to the corresponding slot of the sorting module.

* * * * *